(12) United States Patent  
Skinner

(10) Patent No.: US 12,503,160 B2  
(45) Date of Patent: Dec. 23, 2025

(54) SYSTEM AND METHOD FOR STEERING DAMPING

(71) Applicant: TuSimple, Inc., San Diego, CA (US)

(72) Inventor: Todd B. Skinner, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 50 days.

(21) Appl. No.: 18/444,133

(22) Filed: Feb. 16, 2024

(65) Prior Publication Data

US 2024/0286674 A1 Aug. 29, 2024

Related U.S. Application Data

(60) Provisional application No. 63/487,107, filed on Feb. 27, 2023.

(51) Int. Cl.
*B62D 7/22* (2006.01)

(52) U.S. Cl.
CPC .............. *B62D 7/224* (2013.01); *B62D 7/228* (2013.01)

(58) Field of Classification Search
CPC .......... B62D 7/224; B62D 7/22; B62D 7/222; B62D 7/226; B62D 7/228; B62D 5/0472; B62D 6/06
See application file for complete search history.

(56) References Cited

U.S. PATENT DOCUMENTS

| | | |
|---|---|---|
| 5,042,625 A | 8/1991 | Maus |
| 5,208,750 A | 5/1993 | Kurami et al. |
| 7,793,754 B2 * | 9/2010 | Shimizu ............... B62D 5/0469 701/42 |
| 2020/0361494 A1 | 11/2020 | Zheng et al. |
| 2021/0276615 A1 | 9/2021 | Xheng et al. |
| 2024/0375711 A1 * | 11/2024 | Nakaya .................... B62D 3/12 |

FOREIGN PATENT DOCUMENTS

| | | |
|---|---|---|
| DE | 4405325 C1 | 9/1995 |
| DE | 10329234 A1 | 1/2005 |
| JP | 60045476 | 11/1985 |

(Continued)

OTHER PUBLICATIONS

"How to React to a Front Tire Blowout in a CDL Vehicle—Driving Academy", Driving Academy, 4 pages, (Apr. 25, 2024). [Retrieved from the Internet Apr. 25, 2024: <URL: https://www.youtube.com/watch?v=9m1QbHv99fM>].

(Continued)

*Primary Examiner* — Jacob M Amick

(74) *Attorney, Agent, or Firm* — Perkins Coie LLP

(57) ABSTRACT

Provided herein is a system and method for damping the steering of a vehicle. Methods of an example include: steering a pair of steerable wheels of the vehicle with a steering mechanism about an axis substantially perpendicular to an axis of rotation of a respective one of the pair of steerable wheels; damping the steering mechanism at a first damping rate in response to a steering change rate of the pair of steerable wheels being below a predetermined rate; and damping the steering mechanism at a second damping rate in response to the steering change rate of the pair of steerable wheels being above the predetermined rate.

19 Claims, 10 Drawing Sheets

(56) References Cited

FOREIGN PATENT DOCUMENTS

| JP | 1989042712 A | 9/1990 |
| JP | 2578119 B2 | 2/1997 |

OTHER PUBLICATIONS

"Semi Truck Blowout at Highway Speed | Real World Police: Roadcam", Real World Police, 4 pages, (Apr. 25, 2024). [Retrieved from the Internet Apr. 25, 2024: <URL:https://www.youtube.com/watch?v=FqA7qJu12xc>].

"Steering damper", Wikipedia, 1 page, (Aug. 24, 2023). [Retrieved from the Internet Feb. 21, 2024: <URL: https://en.wikipedia.org/wiki/Steering_damper>].

"Truck crashes after tire blowout, kills driver", Dash Cams, 4 pages, (Oct. 5, 2011). [Retrieved from the Internet Apr. 25, 2024: <URL: https://www.youtube.com/watch?v=g1DTU2w4r7Y>].

BB, "Blown Steer tire dash cam", 4 pages, (May 5, 2016). [Retrieved from the Internet Apr. 25, 2024: <URL: https://www.youtube.com/watch?v=PEzudT9httQ>].

Leitan, Bogdan Mihai, "Semi Truck Steer Tire BlowOut", 3 pages, (Apr. 25, 2024). [Retrieved from the Internet Apr. 25, 2024: <URL: https://www.youtube.com/watch?v=iOEmeq7yyt0>].

Motor Trend Group, LLC., "What does a Jeep Steering Stabilizer Do?," Motortrend, (2024). [Retrieved from the Internet Feb. 21, 2024: <URL: https://www.motortrend.com/how-to/what-is-a-steering-stabilizer/>].

Petrov, Kostadin, "Semi Truck Blows Front Tire, Loses Control And Crashes Into A House", 3 pages, (Feb. 8, 2016). [Retrieved from the Internet Apr. 25, 2024: <URL: https://www.youtube.com/watch?v=UmPvI80OiZo>].

U.S. Department of Transportation, FMCSA, Inspection, Repair, and Maintenance for Motor Carriers of Passengers—Part 396, (Jul. 12, 2019). [Retrieved from the Internet Feb. 21, 2024: <URL: https://www.fmcsa.dot.gov/safety/passenger-safety/inspection-repair-and-maintenance-motor-carriers-passengers-part-396>].

Patent Cooperation Treaty, International Search Report and the Written Opinion of the International Searching Authority for International Appl. No. PCT/US2024/015910, mailed on Jun. 21, 2024, 11 pages.

\* cited by examiner

SYSTEM AND METHOD FOR STEERING DAMPING

CROSS-REFERENCE TO RELATED APPLICATIONS

This application claims priority to U.S. Provisional Patent Application Ser. No. 63/487,107, filed on Feb. 27, 2023, the contents of which are hereby incorporated by reference in their entirety.

TECHNOLOGICAL FIELD

An example embodiment of the present disclosure relates generally to a steering system of a vehicle, and more particularly, to steering damping between steering input and steering output.

BACKGROUND

Vehicle control requires control of a propulsion mechanism and a steering mechanism to drive a vehicle along a path. Propulsion mechanisms generally include a variety of engine types with different fuels, electric motors, or a combination thereof. Steering mechanisms include a range of mechanical and electro-mechanical devices to receive input, such as from a human driver, and convert the input into movement of wheels of the vehicle to control the aim of the vehicle along the path.

As a vehicle travels along a travel surface, whether the surface is a road (e.g., paved, gravel, dirt, etc.) or an unimproved surface, the vehicle can encounter issues that cause feedback on the output of the steering mechanism which is transmitted to the input. The output of the steering mechanism includes the steerable wheels of a vehicle in contact with the travel surface, while the input is generally in the form of a steering wheel that can be used to manually turn a steering shaft, or an electro-mechanical device that facilitates turning of the steering shaft autonomously or semi-autonomously. Ideally, input to the steering input is transmitted to the steering output. However, when the steerable wheels of a vehicle encounter travel surface irregularities or mechanical issues relating to the steerable wheels, the steering output can transmit feedback to the steering input. This feedback can produce negative results with respect to driver comfort and with respect to vehicle control.

BRIEF SUMMARY

A system and method are therefore provided for damping a steering system of a vehicle. Embodiments provided herein include a system for damping the steering system of a vehicle including: a steering mechanism of the vehicle for steering a pair of steerable wheels about an axis substantially perpendicular to an axis of rotation of a respective one of the pair of steerable wheels; a first damper having a first damping rate, where the first damper is attached between the steering mechanism and the vehicle; and a second damper having a second damping rate, where the second damper is attached between the steering mechanism and the vehicle, wherein the first damper applies the first damping rate to the steering mechanism in response to a steering change rate of the pair of steerable wheels below a predetermined rate, and where the second damper provides the second damping rate to the steering mechanism in response to the steering change rate above the predetermined rate.

According to some embodiments, the steering change rate includes a rate at which the pair of steerable wheels turn about the axis. The second damping rate of an example embodiment is greater than the first damping rate. The first damping rate of an example embodiment is a linear rate of damping force relative to the steering change rate. The second damping rate of an example embodiment is a linear rate of damping force relative to the steering change rate. The second damping rate of an example embodiment is a non-linear rate of damping force relative to the steering rate change. The second damping rate of some embodiments substantially locks the steering mechanism.

According to some embodiments, the first damper is attached at a first end to a steering member of the steering mechanism extending substantially laterally between the pair of steerable wheels, and the first damper is attached at a second end to a structural member of the vehicle. According to some embodiments, the second damper is attached at a first end to a steering member of the steering mechanism extending substantially laterally between the first pair of steerable wheels, and the second damper is attached at a second end to the structural member of the vehicle, where the first damper and second damper function in parallel. Embodiments optionally include a controller, where the controller receives as input the steering change rate, where the controller controls a damping rate of the second damper based on the steering change rate.

The controller of an example embodiment is further configured to determine when the steering change rate of the pair of steerable wheels is generated by a surface along which the pair of steerable wheels travel and determine when the steering change rate of the pair of steerable wheels is generated by input from a steering shaft. According to some embodiments, the controller commands the second damping rate of the second damper and adjusts the second damping rate of the second damper differently when the steering change rate of the pair of steerable wheels is generated by the surface along which the pair of steerable wheels travel than when the steering change rate of the pair of steerable wheels is generated by the input from the steering shaft. According to some embodiments, the second damping rate of the second damper is higher when the steering change rate of the pair of steerable wheels is generated by the surface along which the pair of steerable wheels travel than when the steering change rate of the pair of steerable wheels is generated by the input from the steering shaft.

Embodiments provided herein include a method for damping steering of a vehicle including: steering a pair of steerable wheels of the vehicle with a steering mechanism about an axis substantially perpendicular to an axis of rotation of a respective one of the pair of steerable wheels; damping the steering mechanism at a first damping rate in response to a steering change rate of the pair of steerable wheels being below a predetermined rate; and damping the steering mechanism at a second damping rate in response to the steering change rate of the pair of steerable wheels being above the predetermined rate. The second damping rate of some embodiments resists the steering change rate greater than the first damping rate. The damping of the steering mechanism at the first damping rate is achieved, in some embodiments, with a first steering damper, and the damping of the steering mechanism at the second damping rate is achieved with a second steering damper.

The method of some embodiments further includes: determining whether the steering change rate of the pair of steerable wheels is generated by a surface along which the pair of steerable wheels travel or generated by input from a steering shaft; and damping the steering mechanism differently when the steering change rate of the pair of steerable wheels is generated by the surface along which the pair of steerable wheels travel than when the steering change rate of the pair of steerable wheels is generated by the input from the steering shaft Embodiments provided herein include an apparatus for damping steering of a vehicle including: a first damper disposed between a steering mechanism of the vehicle and structural member of the vehicle, the steering mechanism of the vehicle configured for steering a pair of steerable wheels about an axis substantially perpendicular to an axis of rotation of a respective one of the pair of steerable wheels; and a second damper disposed between the steering mechanism of the vehicle and the structural member of the vehicle, where the first damper provides a first damping rate based on a rate of change of steering of the pair of steerable wheels being below a predefined rate, and where the second damper provides a second damping rate based on the rate of change of steering of the pair of steerable wheels being above the predefined rate. The second damping rate of an example embodiment resists steering of the pair of steerable wheels at a greater rate than the first damping rate. The first damper of an example embodiment operates in parallel with the second damper.

BRIEF DESCRIPTION OF THE DRAWINGS

Figure 1:
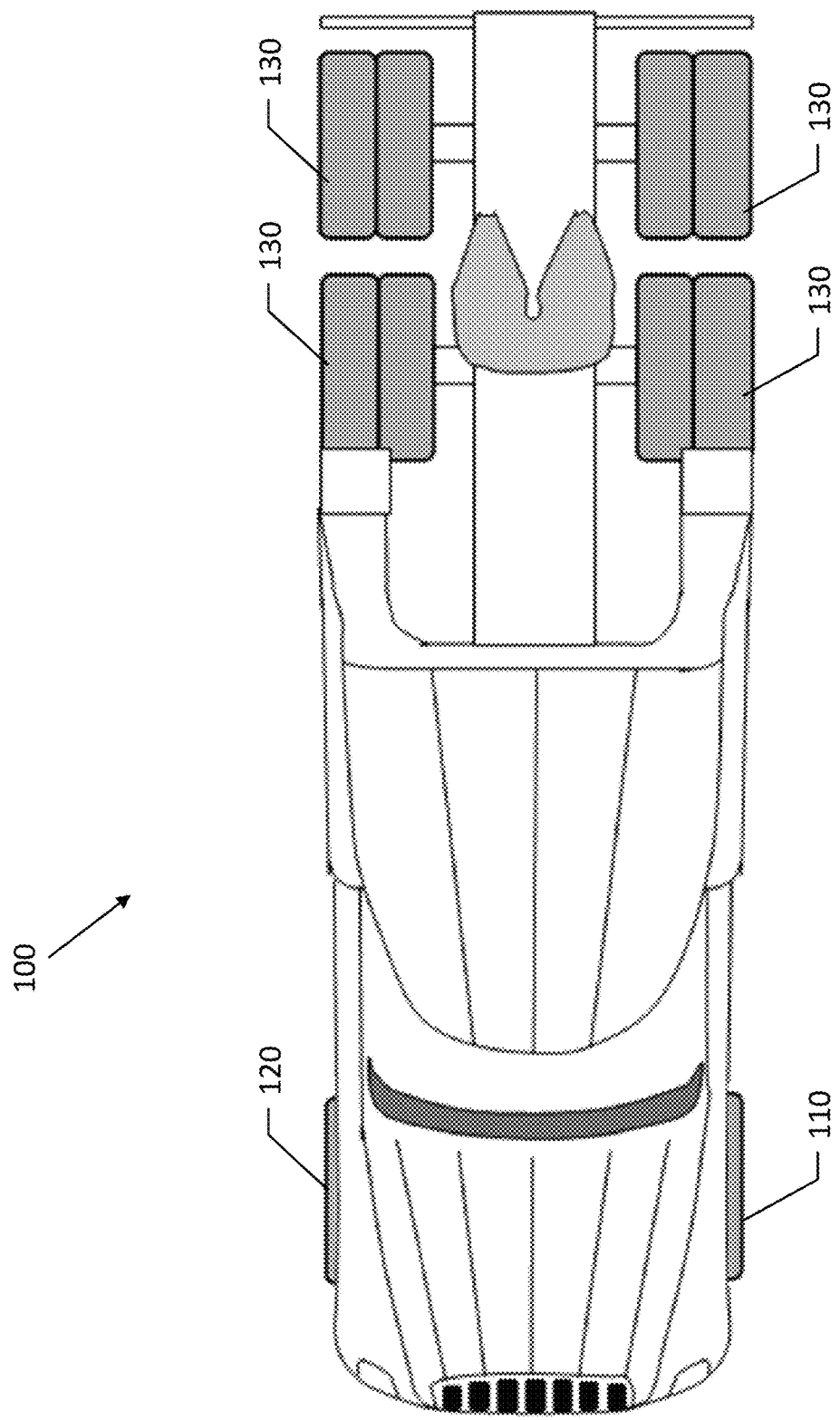
Figure 2:
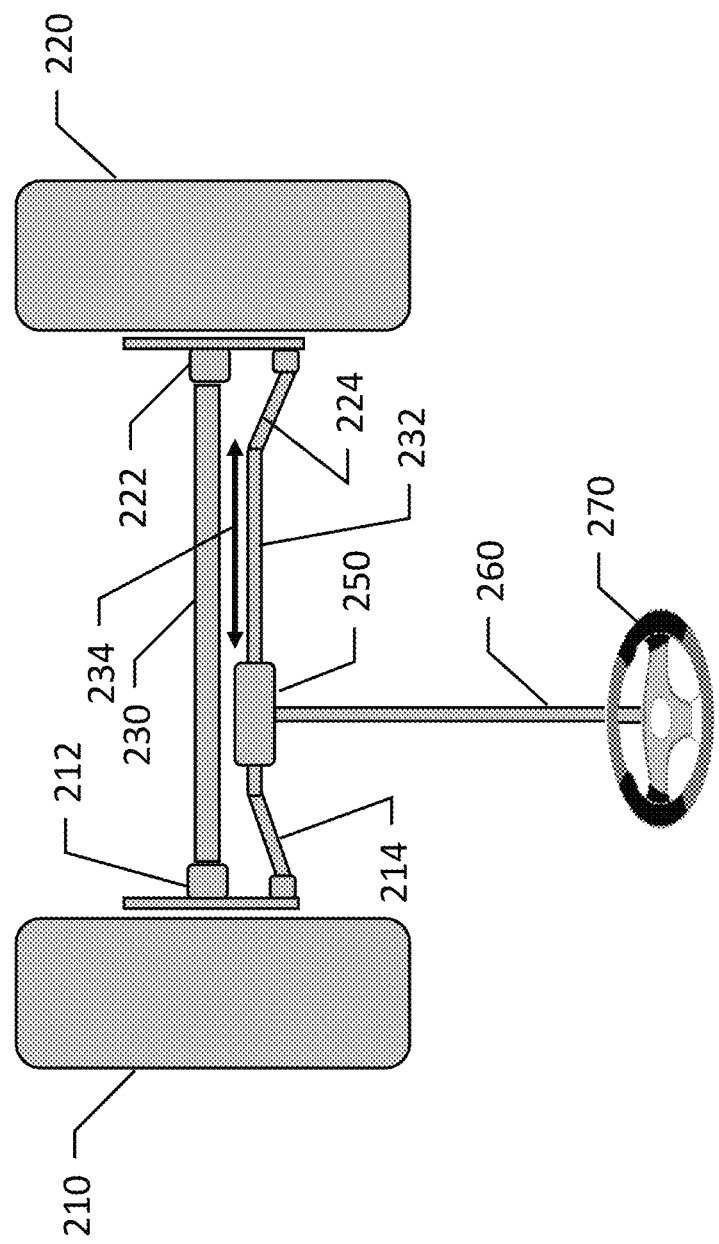
Figure 3:
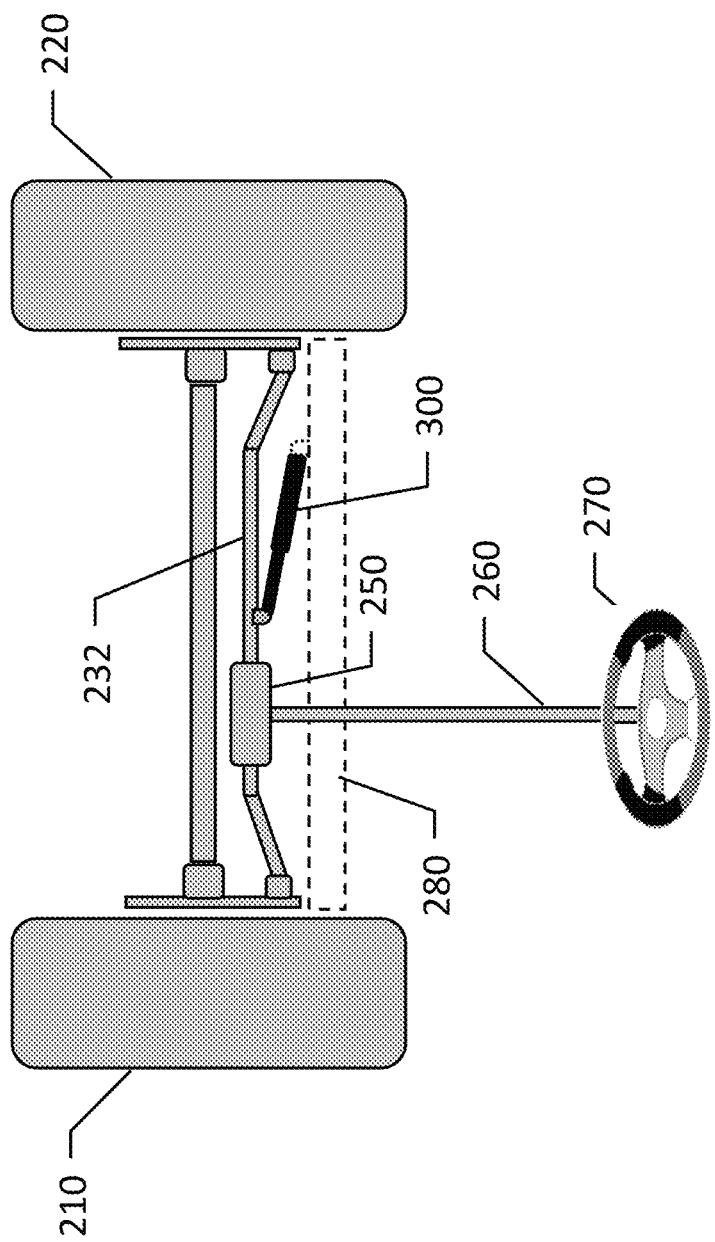
Figure 4:
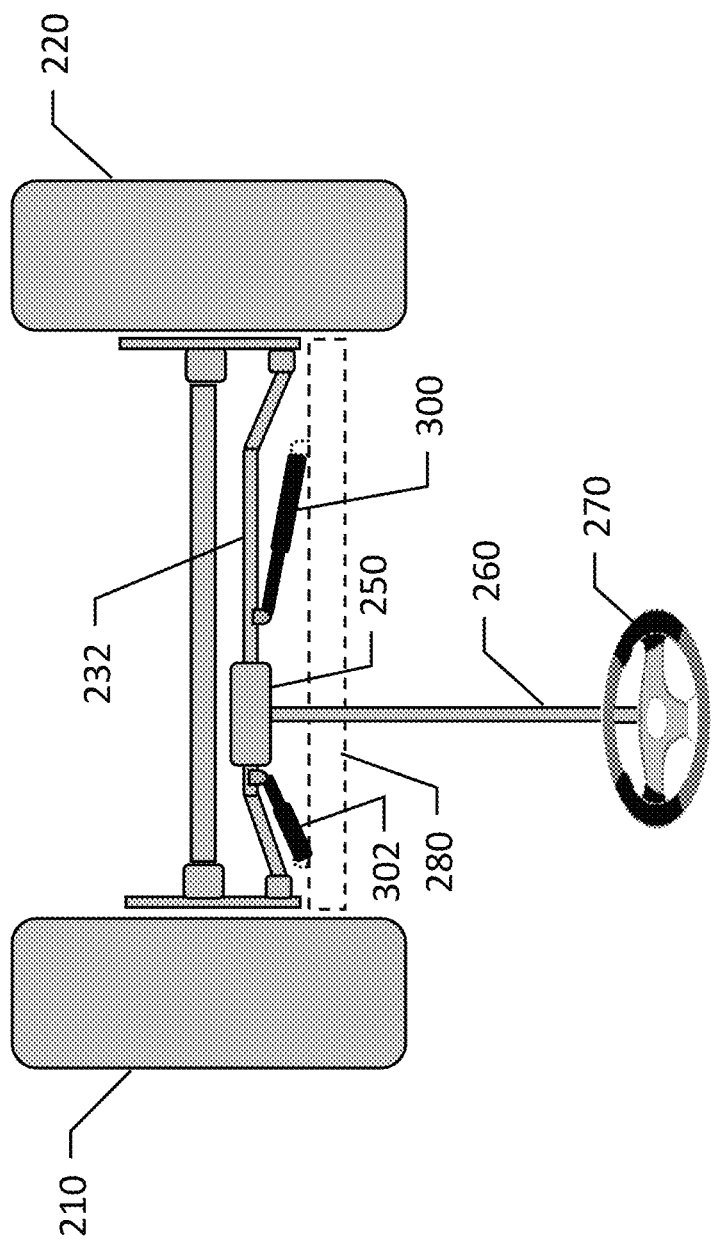
Figure 5:
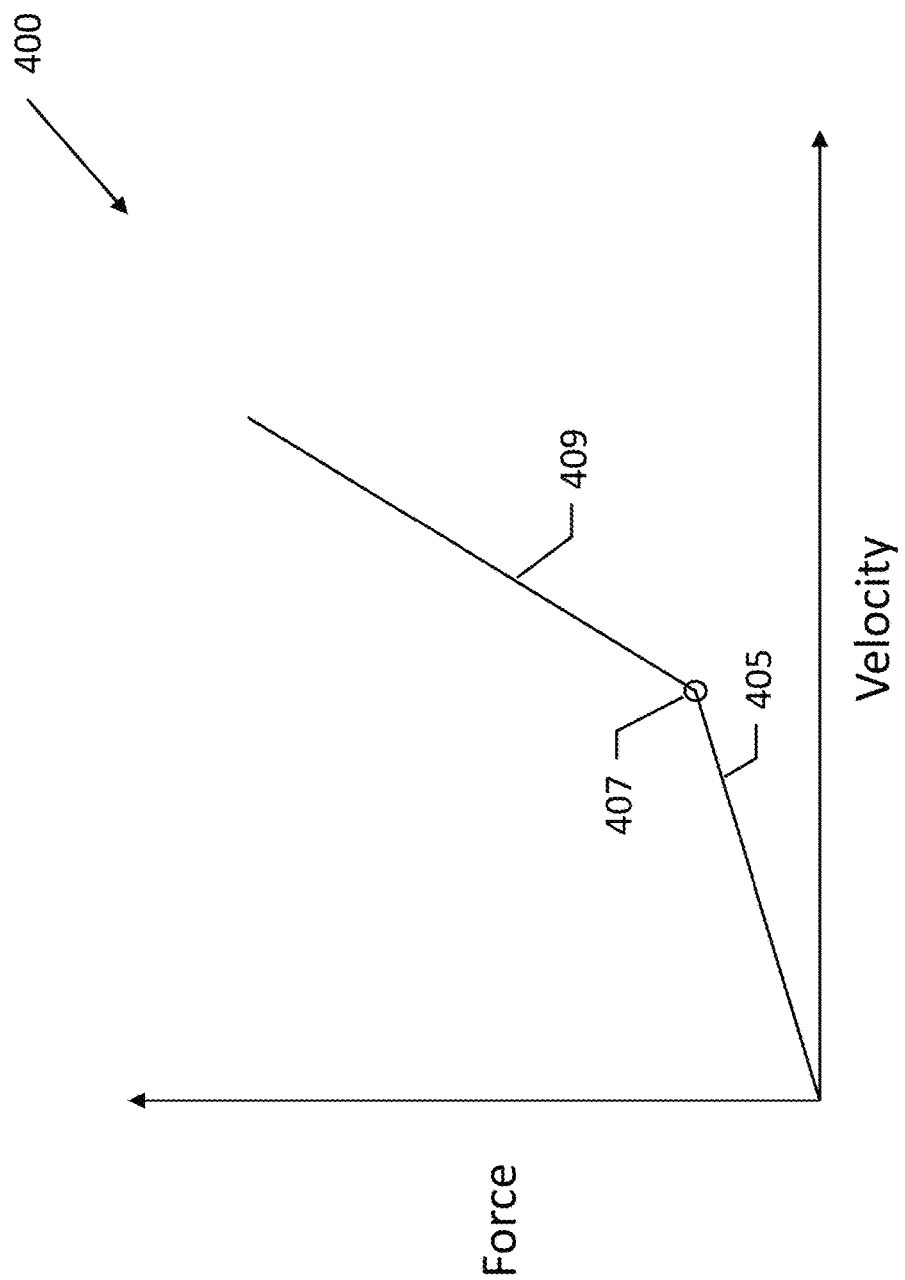
Figure 6:
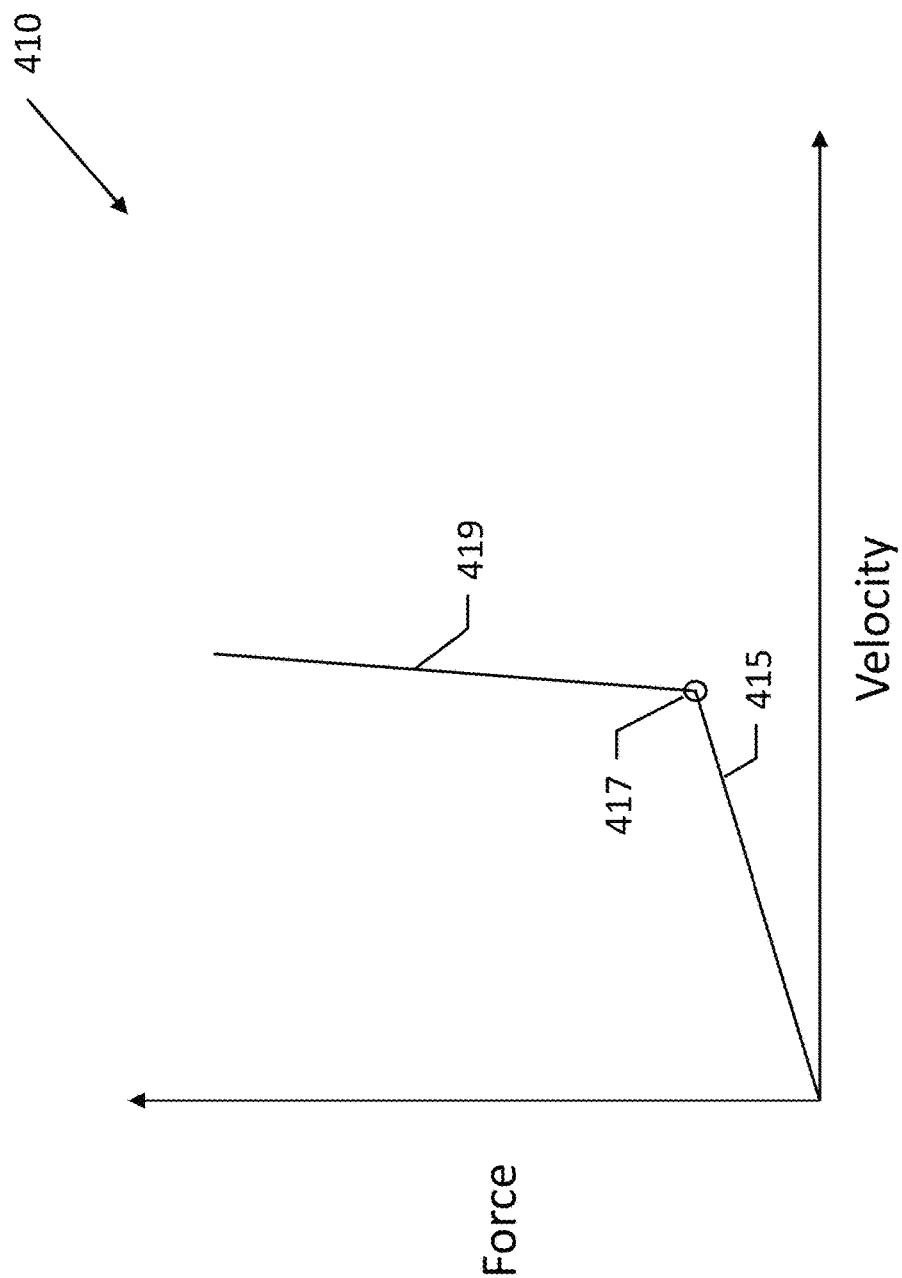
Figure 7:
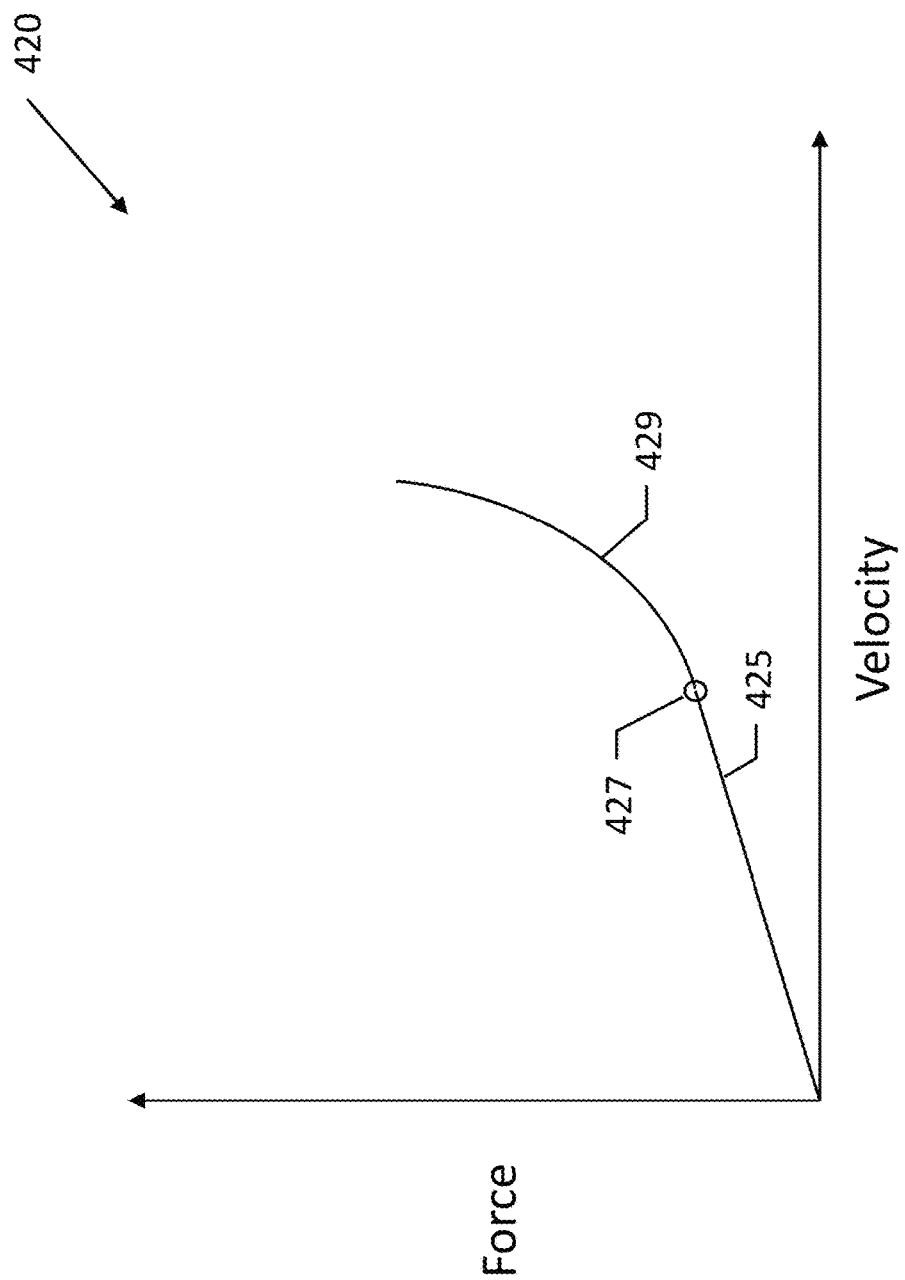
Figure 8:
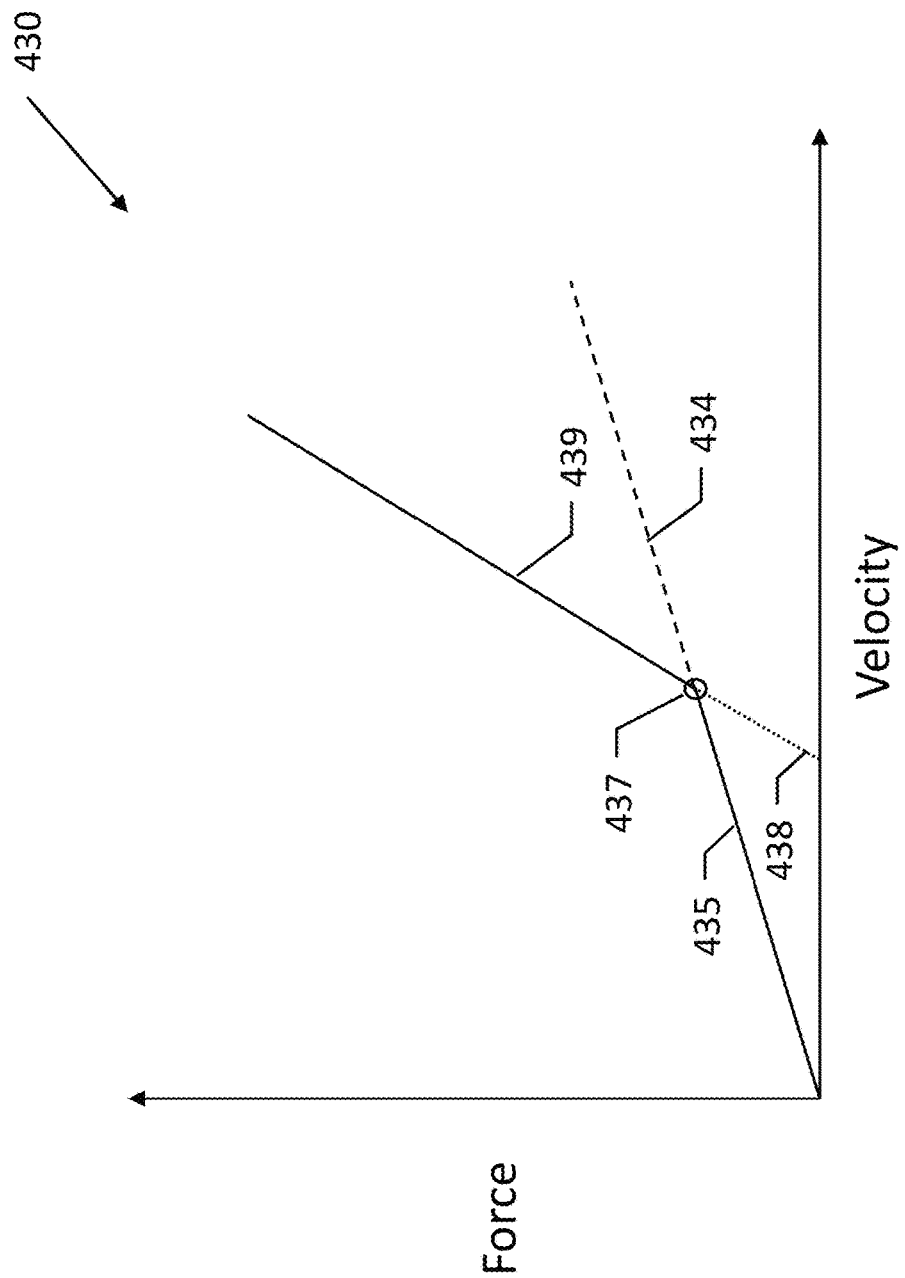
Figure 9:
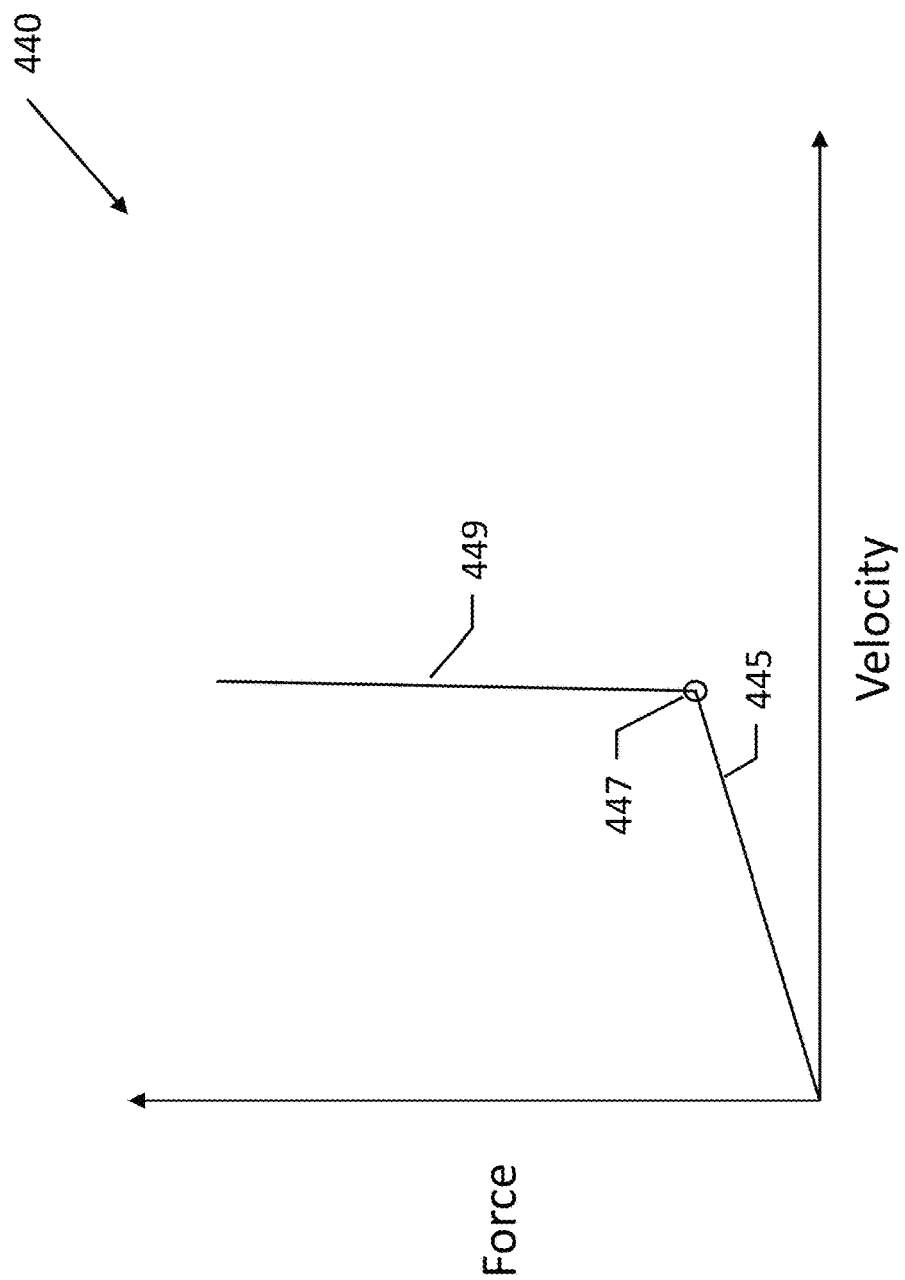
Figure 10:
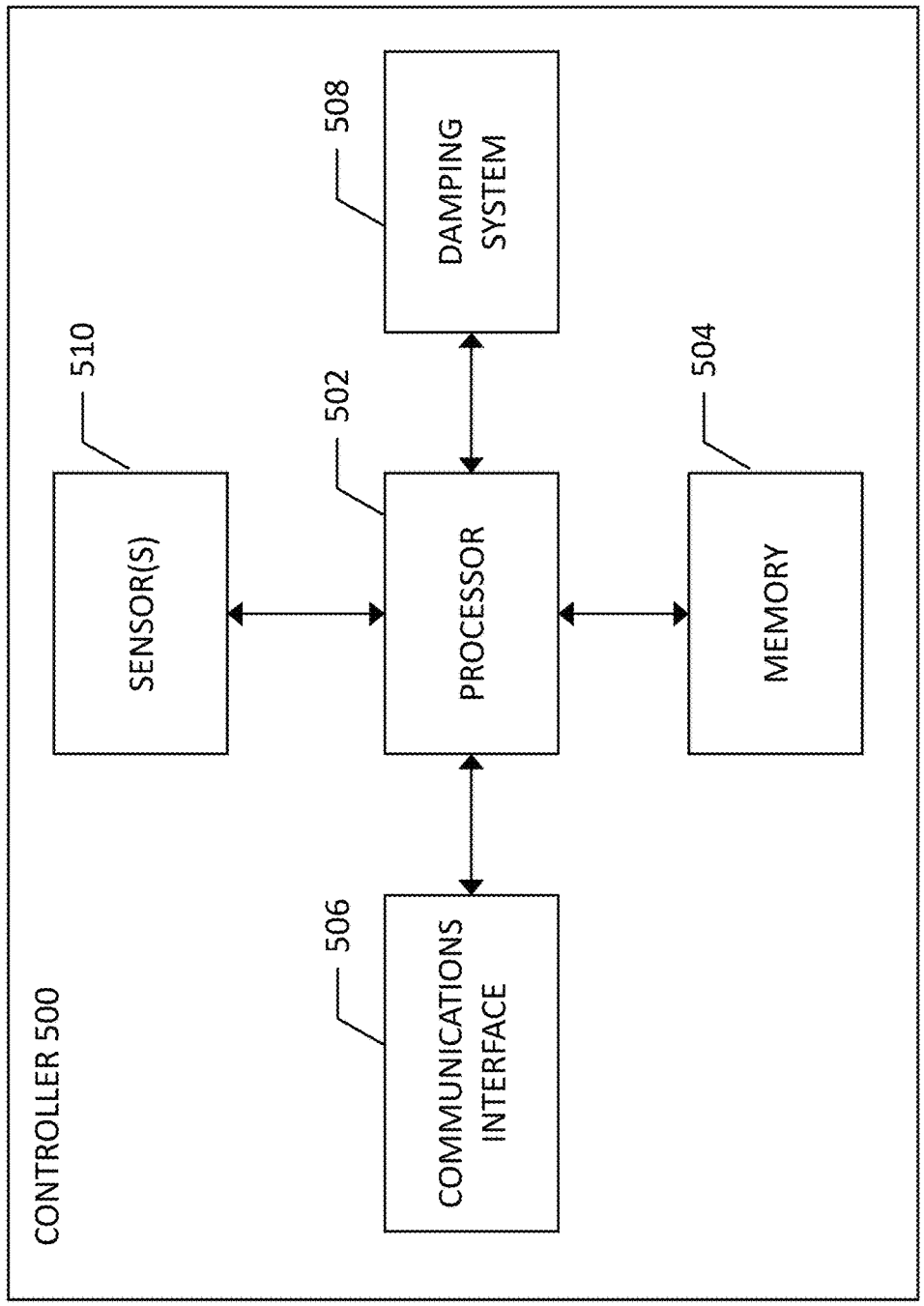

Having thus described certain example embodiments of the present invention in general terms, reference will hereinafter be made to the accompanying drawings which are not necessarily drawn to scale, and wherein:

FIG. 1 illustrates a top-view of a vehicle including at least one pair of steerable wheels according to an example embodiment of the present disclosure;

FIG. 2 illustrates a steering mechanism according to an example embodiment of the present disclosure;

FIG. 3 illustrates a damped steering mechanism according to an example embodiment of the present disclosure;

FIG. 4 illustrates a damped steering mechanism according to another example embodiment of the present disclosure;

FIG. 5 illustrates a plot of damping force relative to steering change rate according to an example embodiment of the present disclosure;

FIG. 6 illustrates another plot of damping force relative to steering change rate according to an example embodiment of the present disclosure;

FIG. 7 illustrates still another plot of damping force relative to steering change rate according to an example embodiment of the present disclosure;

FIG. 8 illustrates another plot of damping force relative to steering change rate according to an example embodiment of the present disclosure;

FIG. 9 illustrates still another plot of damping force relative to steering change rate according to an example embodiment of the present disclosure; and FIG. 10 illustrates a block diagram of a controller configured to control an active damping system according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Embodiments described herein generally relate to steering systems for vehicles. The steering systems of example embodiments are applicable to on-road and off-road vehicles, as well as autonomous, semi-autonomous, and non-autonomous vehicles. Autonomous vehicle control, as described herein, includes vehicle control that is performed at least partially by a vehicle controller taking some responsibilities away from a human driver. Autonomous vehicle control can include semi-autonomous control, where certain functions are performed by a controller, while a human driver performs other functions, and fully-autonomous control, where a human driver is not necessary for control and navigation of the vehicle. Autonomous vehicle control, as described herein, includes this array of control possibilities such that the term "autonomous vehicle control" can include any degree of autonomous control ranging from minimal autonomy to fully autonomous. While not necessarily required, a driver may remain present in fully-autonomously controlled vehicles to intervene as necessary, and to monitor autonomous performance.

Steering systems for wheeled vehicles include a variety of techniques that generally transmit rotational input of a steering shaft, generally receiving input through a steering wheel, to linear output, where the linear output translates the steerable wheels of the vehicle to cause the vehicle to turn left or right. FIG. 1 illustrates an example embodiment of a vehicle 100, which in the illustrated embodiment is a class 8 tractor. The vehicle includes a pair of steerable wheels including a left steerable 110 wheel and a right steerable wheel 120. The vehicle 100 also includes driven wheels 130. In some cases, driven wheels of a vehicle can also be steerable wheels, such as in front-wheel drive and all-wheel-drive vehicles, or in vehicles with more than one pair of steerable wheels (e.g., all-wheel steering). Embodiments of the present disclosure can be implemented in any steerable wheel of a vehicle, as will be appreciated by one of skill in the art.

FIG. 2 illustrates a simplified embodiment of a steering system. The illustrated embodiment is one of a variety of steering configurations and types that can implement embodiments of the present disclosure. In some embodiments, more, fewer, or different components of the steering system may be implemented. The illustrated embodiment includes a left steerable wheel 210 and a right steerable wheel 220, with the left steerable wheel connected to a left steering knuckle 212 and the right steerable wheel connected to a right steering knuckle 222. The steering knuckles pivot about a substantially vertical axis (e.g., substantially orthogonal to the illustrated image) enabling the steerable wheels to rotate and turn left and right relative to the vehicle. An axle 230 is present in some embodiments, such as a solid-axle front end. In some embodiments, such as a front-wheel drive vehicle, the axle 230 may be embodied by a pair of half shafts that connect at one end to a respective wheel, and are driven at the other end, such as through a transmission, transaxle, or differential. In some embodiments, there is no axle 230 or half shafts, such as in a vehicle with independent front suspension and without the front wheels being driven wheels.

The left steering knuckle 212 is connected to a steering member 232 via left tie rod 214, while the right steering knuckle 222 is connected to the steering member 232 by the right tie rod 224. The steering member 232 of the illustrated embodiment is connected to a steering box 250. The steering box 250 can include a rack-and-pinion type gear interface between the steering member 232 (e.g., the rack) and a steering shaft 260. The steering shaft 260 is turned by the steering wheel 270 by an operator. Rotation of the steering shaft 260 is translated to linear movement by the steering box 250, such that the steering member moves laterally along arrow 234. The movement of the steering member translates to movement of each steering knuckle about the substantially vertical axis to rotate the steerable wheels left and right.

Steering configurations can take a variety of forms, such as embodiments that do not employ a rack-and-pinion type system, but may employ a pitman arm to translate rotational input of the steering shaft to lateral movement of a steering member. A worm-gear arrangement in a steering box can optionally be employed to translate the rotational input of the steering shaft into lateral movement that translates the steerable wheels. Each of these types of steering mechanisms that translates motion from an input to the steerable wheels can employ embodiments of the present disclosure to mitigate unwanted input to the steering system from the steerable wheels, as will be apparent to one of ordinary skill in the art.

According to embodiments of the steering system described herein, there exists a mechanical connection between the steerable wheels and the steering wheel. This mechanical connection serves to efficiently and effectively take steering input at the steering wheel and produces steering output at the steerable wheels. However, feedback through the mechanical steering system can occur when forces are encountered at the steerable wheels. For example, during rapid pressure loss in a tire or a "blowout" where pressure is lost virtually instantaneously, feedback through the steering system can be significant. Unwanted feedback can also be experienced when a steerable wheel encounters road debris, potholes, cracks, or other objects and surface defects. This unwanted feedback can be sudden in nature, which can lead to a loss of steering control, which can result in a collision, lane departure, or other uncontrolled motion.

This input at the steerable wheel can have a variety of causes, such as the road or travel surface irregularities identified above. A tire failure can also be the cause of unwanted input at the steerable wheels. With a tire failure, such as the "blowout" described above, a tire can rapidly lose pressure. A blowout can occur for a variety of reasons. For example, when a tire has a low tire pressure, the tire deforms at the point of contact with the roadway. During each rotation of the tire, the deformation is moved about the outer diameter of the tire. This deformation creates heat and warms the tire. As a speed of rotation of the tire increases, the tire continues to heat up, and if the heat build up is sufficient, the tire can fail with a rapid pressure loss. Other blowout causes can include a tire encountering a piece of debris that punctures or slices the tire, or a wheel rim being bent through contact with an object. In each of these cases, rapid tire pressure loss can cause the steerable wheels to move in an unwanted and unanticipated manner. Losing pressure in the front right steerable tire while traveling at speed will result in a vehicle rapidly changing path to the right. Rapidly losing pressure in a left front steerable tire while traveling at speed will result in a vehicle rapidly changing path to the left. This is a result of shifting weight or load on the steerable wheels and additional forces induced through the bad tire/wheel back into the steering system.

Such rapid pressure loss in a tire is not uncommon, and there are two primary catalysts at the root cause of most such events: failure to properly and regularly inspect the tires before travel; and failing to replace tires that are worn or appear defective or damaged. Factors that can contribute to such pressure loss events include: tire under-inflation (described above), tire over-inflation, overloading of cargo increasing pressure on tires, ordinary wear and tear of tires, excessive wear resulting in dangerously low tire tread, mismatched or improperly sized tires, failure to monitor tire recalls, excessive/aggressive braking, road surface anomalies, and debris.

The unwanted feedback received through input at the steerable wheels of a vehicle can be detrimental to both manually-driven vehicles and autonomously or semi-autonomously controlled vehicles. For manually driven vehicles, the feedback through the steering system can be unexpected and significant, which can result in over-correction, under-correction, or outright loss of control. For autonomous vehicles, the autonomous control needs to be able to both correct for slow drifts in steering input as well as to address dramatic, fast-acting changes in steering angle of the steerable wheels caused by forces exerted on the steerable wheels.

The unwanted input to the steerable wheels from rapid tire pressure loss, an object encountered by a wheel, or other input can be a safety hazard for the operation of a vehicle, whether operated by a driver, autonomously, or a combination thereof. For example, when a vehicle and particularly a large vehicle or truck is traveling along a highway, the lanes may not be substantially wider than the vehicle. If a tire blowout occurs, the rapid loss of pressure can cause a near instantaneous pulling of the steering system to a side corresponding to the blown out tire, and if the vehicle is a tractor-trailer, a tire blow-out may cause the vehicle to jack knife. Without the damping systems described herein, such a steering response can cause the vehicle to veer into another lane or even off of the road. Embodiments described herein mitigate these steering inputs at the steerable wheels to avoid loss of control and to help a driver or autonomous controller to regain control of the vehicle while limiting steering deviation from the intended course.

Steering dampers or steering stabilizers can be used to mitigate feedback in the steering system. Steering dampers and stabilizers, collectively referred to herein as steering dampers, can be mechanically coupled to the steering system to dampen unwanted feedback received as forces experienced by the steerable wheels. FIG. 3 illustrates an example embodiment of a steering damper 300 implemented in a steering system shown in FIG. 2. FIG. 3 illustrates the steering system of FIG. 2, and further depicts a structural member 280 of the vehicle. The structural member 280 can be, for example, a frame cross-member, frame rail, or other structurally secure member of the vehicle. The steering damper 300 is illustrated connected at one end to the structural member 280, and at the other end to the steering member 232. The steering damper 300 is generally installed substantially horizontally, primarily to absorb unwanted lateral movement along the path between the steerable wheels along the steering member 232. Steering dampers absorb unwanted energy input and convert the energy input into heat, such as using hydraulic fluid and valving. Steering dampers can optionally be electro-mechanical devices that resist movement and absorb energy through magnetic force. Electro-mechanical steering dampers can be active dampers with variable damping rates as described further below.

One example of an electro-mechanical steering damper includes an embodiment disposed at a steering shaft 260 of the steering system. A stator can be disposed about the steering shaft 260 with the steering shaft functioning as a rotor within the stator. Electrical current flowing through the stator generates a magnetic field that can drive the steering shaft in a chosen direction. Such a system can be employed for autonomous vehicle control to control steering of the vehicle in general, but can also act as a damping system for resisting feedback from the steerable wheels reaching the steering wheel. Further, such a system of a stator surrounding the steering shaft as a rotor can function as a power steering device by providing steering assistance to input received at the steering wheel to help turn the steerable wheels of the vehicle.

FIG. 4 illustrates a steering system similar to that of FIG. 3. However, the steering system of FIG. 4 includes a second steering damper 302. The second steering damper 302 functions in the same manner as the first steering damper 300 with the damper resisting unwanted lateral movement of the steering system. The steering dampers function to resist movement that is experienced along an axis transverse between the wheels.

While the illustrated embodiments include one steering damper (FIG. 3) and two steering dampers (FIG. 4), embodiments can employ any number of steering dampers. Further, the position and size of the steering dampers can be configured based on the individual use case. Dampers may be in a parallel arrangement, a symmetrical arrangement, or an asymmetrical arrangement as shown in FIG. 4. The steering dampers described herein can be linear-rate or non-linear-rate dampers. The steering dampers can be mechanical such as hydraulic fluid dampers, or electro-mechanical, such as magnetorheological dampers, magnetic-force dampers, etc.

Embodiments described herein generally employ one or more steering dampers to reduce unwanted feedback from road features back to the steering wheel. Steering function based on input from the steering wheel is used for controlling the vehicle as it travels along a travel path. Steering input at the steering wheel is generally intentional input and should be conveyed to the steerable wheels of the vehicle without requiring too much force from a driver. Steering can be hydraulically assisted power-steering that helps reduce the required input force from a driver. Power-steering can have variable rates of assistance. For example, in low-speed, high-maneuverability situations, such as in an urban environment, parking lot, loading dock, etc. can benefit from a greater degree of power assistance as turning of steerable wheels is generally more difficult with lower speed, and most difficult then stopped. In highway driving, less power steering assistance may be beneficial as sharp corners are not experienced and greater steering effort is beneficial to maintain vehicle course. Power steering can further mitigate the damping effect of dampers described herein. The power-steering assistance provided by a power-steering system can overcome the damping of steering dampers described herein.

Using power steering to help overcome the damping effects of the steering dampers can render the damping systems described herein relatively transparent to a driver of a vehicle. The driver may not experience any added effort or difficulty in steering of the vehicle. Further, power steering provides assistance when steering input is received at the steering wheel rather than when steering input is received at the wheels from road surface features.

Embodiments provided herein can be employed in manually driven vehicles, fully-autonomously driven vehicles (driverless), and any combination therebetween. Autonomous vehicle control is becoming more widely adopted, with increasing levels of autonomy becoming practical. Autonomous vehicle control is particularly beneficial for transport of goods, where such transport can occur at all hours of the day and for long distances. Although the systems and methods of example embodiments may be employed in conjunction with a variety of different types of autonomous vehicles, the systems and methods described herein will be described in are particularly beneficial for large vehicles, such as trucks that are configured to transport goods and operate autonomously by way of example, but not of limitation. As will be appreciated, embodiments of the present disclosure are employed to mitigate physical failures of components of a vehicle. While these failures can occur on any vehicle, the effects of such failures are dramatically increased for larger and heavier vehicles, such that systems of example embodiments are particularly beneficial for larger vehicles. Any larger vehicles (trucks, busses, construction vehicles, etc.) can benefit from embodiments of the present disclosure in a manner that may be more significant than a traditional passenger vehicle due to the vehicle size and weight, and the effects of the component failures described herein.

A first embodiment of a steering system described herein employs a linear, two-speed progressive steering damping system with the damping rate illustrated in the graph 400 of FIG. 5. For low-speed steering angle changes (low speed damper shaft), the damper exerts very low progressive force shown as line 405 on the force-vs-velocity graph of FIG. 5, where force is the damping force exerted by the damper, and velocity is the speed of the input (e.g., speed of rotation about the steering knuckle) at the steerable wheels.

The speed of the input at the steerable wheels is representative of how quickly the steerable wheels change the steering direction, referred to herein as a steering change rate or steering rate of change. When a vehicle is driven in normal circumstances, the steerable wheels do not change steering direction very quickly. One reason for this is vehicle control as a rapid change in steerable wheel direction, particularly at speed, would generally lead to understeer and a "plowing" of the vehicle with the tires of the steerable wheels skidding. Further, a rapid change in steerable wheel direction could lead to degradation or loss of control of the vehicle. As such, steering inputs from the steering wheel are generally relatively controlled and measured. Further, the steering mechanism, whether it is rack-and-pinion or some other mechanism generally does not permit very rapid changes in steerable wheel angles due to the steering ratio between the steering wheel input and the steerable wheels as output.

Steering ratio is the number of degrees of turn of the steering wheel relative to the number of degrees the steerable wheels turn as a result. Steering ratio can also be expressed in terms of number of rotations of the steering wheel for turning the steerable wheels from extreme left turning to extreme right turning, otherwise known as "lock-to-lock". Larger vehicles often have a higher steering ratio (more turns lock-to-lock), where a higher steering ratio means that the steering wheel is turned a greater degree of rotation to relative to the angle of turn at the steerable wheels. Greater steering ratios make steering easier, particularly in large and heavy vehicles as there is greater leverage over the steerable wheels through the steering wheel. Low steering ratios are found more commonly in sports cars and race cars where steering input is more precise and effects a greater degree of turning of the steerable wheels.

With higher steering ratios, the steerable wheels are generally not turned at a very high rate or high velocity, such that under normal circumstances, a user or autonomous vehicle steering a vehicle will generally be below the steering velocity at inflection point 407 of FIG. 5, such that the damping of the steering mechanism during normal driving operation is found along line 405. When the velocity of steering angle changes increases above the inflection point 407, the damping system damping rates behaves with a drastically increased progressive force as shown at line 409. This rapid steering angle change is interpreted as unwanted, and therefore damped with a higher force. This increased damping rate will help slow the rate of steering angle change and help prevent the vehicle from deviating from its intended path. Such control improvement will allow a driver or autonomous vehicle control system to process and apply the corrective throttle and steering inputs.

According to an example embodiment of FIG. 5, a right front steerable wheel tire blows out and pressure is rapidly lost. The vehicle will quickly move to the right as the tire subject to the blowout applies greater friction to the road surface (e.g., due to a substantially increased contact patch), and the rate at which the steering angle changes will increase dramatically. The damping system will reach the increased damping force of line 409, which will reign in the steering angle change and prevent the steering angle from continuing a rapid rate of change, thereby allowing the steering system to be rotated back to the left by the user or autonomous control in order to regain control of the vehicle.

The damping system to effect the damping rates shown in FIG. 5 can be employed using a single, multi-rate damper, two dampers having different rates operating in parallel, or a plurality of dampers to achieve the illustrated damping effect. According to some embodiments, the damping system employed for the embodiment of FIG. 5 can be a passive damping system or an active damping system. In a passive damping system, the damper(s) receive no feedback and respond only to the rate of change of the steering angle of the steering system. With higher steering rate change comes increased damping force, and above the inflection point, a substantially higher damping force. With an active damping system, the rate of change of steering angle and/or damping force can be fed back to the damping system (e.g., a controller thereof), and the damper(s) controlled, at least in part, based on this feedback. The damping system can be controlled using active dampers that control a damping rate using a signal from a controller. Active damping can employ control of hydraulic fluid orifices to increase/decrease damping, control of magnetorheological fluid used within a damper to control the viscosity, control of electro-mechanical resistance of a damper, or the like. In this manner, a single active damper could be used in place of multiple passive dampers in some cases.

FIG. 6 illustrates an example embodiment of a linear two-speed "locking" steering damper system. According to the embodiment of FIG. 6 illustrated in graph 410, the relatively low damping force of line 415 is depicted while the velocity of steering rate change remains relatively low. With increased velocity of steering rate change along the x-axis, beyond inflection point 417, such as with a rapid tire pressure loss or wheel impacting an object, the damping system behaves dramatically differently with a drastic increased damping force tantamount to locking of the damper (e.g., rendering the damper a solid member) along line 419. This rapid increase to the damping force will help prevent the vehicle from deviating from its intended path and allow for the driver or automated steering system to process and apply the corrective throttle and steering inputs.

The damping system to effect the damping rates shown in FIG. 6 can be employed using a single, multi-rate damper, two dampers having different rates operating in parallel, or a plurality of dampers to achieve the illustrated damping effect. According to some embodiments, the damping system employed for the embodiment of FIG. 6 can be a passive damping system or an active damping system. In a passive damping system, the damper(s) receive no feedback and respond only to the rate of change of the steering angle of the steering system. With higher steering rate change comes increased damping force, and above the inflection point 417, a substantially higher damping force. With an active damping system, the rate of change of steering angle and/or damping force can be fed back to the damping system (e.g., a controller thereof), and the damper(s) controlled, at least in part, based on this feedback. The damping system can be controlled using active dampers that control a damping rate using a signal from a controller. Active damping can employ control of hydraulic fluid orifices to increase/decrease damping, control of magnetorheological fluid used within a damper to control the viscosity, control of electro-mechanical resistance of a damper, or the like. In this manner, a single active damper could be used in place of multiple passive dampers in some cases.

FIG. 7 illustrates an example embodiment of a nonlinear steering damping system. According to the embodiment of FIG. 7 illustrated in graph 420, the relatively low damping force of line 425 is depicted while the velocity of steering rate change remains relatively low. With increased velocity of steering rate change beyond inflection point 427, which can occur with rapid tire pressure loss or a steerable wheel encountering an object, the damping system changes behavior. Beyond the inflection point 427, the damping force increases in an exponential curvature at 429. This rapid increase to the damping fore helps prevent the vehicle from deactivating from its intended path and allow for the driver or automated steering system to process and apply the corrective throttle and steering inputs.

The damping system to effect the damping rates shown in FIG. 7 can be employed using a single, multi-rate damper, two dampers having different rates operating in parallel, or a plurality of dampers to achieve the illustrated damping effect. According to some embodiments, the damping system employed for the embodiment of FIG. 7 can be a passive damping system or an active damping system. In a passive damping system, the damper(s) receive no feedback and respond only to the rate of change of the steering angle of the steering system. With higher steering rate change comes increased damping force, and above the inflection point 427, a substantially higher damping force. With an active damping system, the rate of change of steering angle and/or damping force can be fed back to the damping system (e.g., a controller thereof), and the damper(s) controlled, at least in part, based on this feedback. The damping system can be controlled using active dampers that control a damping rate using a signal from a controller. Active damping can employ control of hydraulic fluid orifices to increase/decrease damping, control of magnetorheological fluid used within a damper to control the viscosity, control of electro-mechanical resistance of a damper, or the like. In this manner, a single active damper could be used in place of multiple passive dampers in some cases.

As described above, the systems can employ either an active damping system or passive damping system. An active damping system can use feedback from the steering system to adjust the damping rate of the damping system. A sensor can detect the change in steering angle of the steerable wheels and use that sensed information to establish a rate of steering angle change. The damping rate commanded by the active damping system can correspond to any of the aforementioned embodiments illustrated in FIG. 5-7. A passive damping system can use a multi-rate damper or use more than one damper having different damping rates to achieve damping rates as depicted in the embodiments of FIG. 5-7.

Optionally, a hybrid system of both passive and active damping can be used. FIG. 8 depicts such an embodiment. In such a hybrid embodiment, a first, passive damper may be used with a linear damping rate illustrated by line 435 of plot 430. Above a predetermined velocity for rate of change of steering angle found at inflection point 437, a second damper can be employed with a damping rate illustrated by line 439. The second damper can be an active damper that is activated responsive to inflection point 437 being reached. Optionally, the second damper can be a passive steering damper that becomes mechanically coupled to the steering mechanism when the steering rate change reaches the predetermined velocity of inflection point 437. In such a case, a mechanical feature, such as a solenoid, may engage the second damper to increase the damping force as shown by line 439.

FIG. 9 illustrates another example embodiment of a hybrid damping system that employs both active and passive damping. The plot 440 of FIG. 9 illustrates the linear damping rate of a steering damper at 445. Upon reaching inflection point 447, the damping rate dramatically increases to a substantially locked damper shown by line 449. This can be accomplished by mechanically locking the passive damper into a fixed, rigid arm that temporarily locks the steering mechanism relative to the structural member in order to provide time for a driver or autonomous control system to regain control of the vehicle.

While the embodiments of FIGS. 5-9 depict a linear damping rate as the relatively lower damping force applied relative to the velocity of the rate of change of the steering angle, embodiments can employ a non-linear damping rate. For example, a damper employed for the damping at a steering angle rate of change below the inflection points can be curvilinear or otherwise non-linear up to the inflection point. In an active damping system, the damping rate can take on even more profiles, such as a step-wise damping rate, inverse damping rate, or the like.

Additional embodiments described herein can employ one or more sensors disposed at the steering shaft 260 of the steering wheel 270 and one or more sensors at the steering mechanism, such as at a steering knuckle (e.g., to detect steering angle change) or at the steering member 232. Such sensors can be employed to determine where steering input is coming from. Steering input received at a steering wheel 270 will be from a driver of a vehicle. Optionally, depending up on the autonomous control, steering input may be received at the steering shaft 260. This steering input can generally be regarded as desirable or approved steering input.

Conversely, steering input that is received at the steerable wheels 210, 220 can be deemed undesirable. This is because the change of the steering angle of the steerable wheels was not commanded by a user or autonomous controller. A sensor identifying steering input from the steering wheel 270 or steering shaft 260 can identify this input as a leading input-before the steering angle of the wheels has changed. A sensor identifying steering input from the steerable wheels can identify this as a leading input-before the steering angle of the steering wheel or steering shaft has changed. Employing sensors in this manner can enable a system of example embodiments to identify desirable versus undesirable steering input.

When desirable steering input is received, a low rate of damping or a low damping force may be employed to enable a driver or autonomous vehicle control system to accurately and reliably steer a vehicle within an environment. Conversely, when undesirable steering input is received, a high rate of damping or high damping force may be applied to limit the steerable wheel rate of change, thereby mitigating adverse steering conditions at the wheels.

For an active damping system to be employed, a controller is needed to control the damping rate of the active damping components. The controller can read sensor values for steering rate change and for feedback on the applied damping rate. Further, the damping rate can employ other sensed information. For example, the speed of travel of a vehicle has a significant impact on how a tire blowout or rapid pressure loss will affect the vehicle itself. At a high rate of speed, a rapid loss of pressure in a tire can have a dramatic impact on control of the vehicle due, in large part, to momentum and the distance with which a vehicle travels in a shorter period of time. At a low rate of speed, a rapid loss of pressure in a tire may not be as significant as the vehicle may be able to quickly come to a stop. Thus, an active damping system as described herein can employ vehicle speed to help establish a damping rate needed to address unwanted steering input.

FIG. 10 is a schematic diagram of an example of a controller 500 that may be implemented to provide active damping of a steering system as described herein. The controller 500 may include or otherwise be in communication with a processor 502, a memory device 504, a communications module 506 and a damping system 508. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 502 (and/or co-processors or any other processing circuitry assisting or otherwise associated with the processor) may be in communication with the memory device 504 via a bus for passing information among components of the apparatus. The memory device 504 may include, for example, one or more volatile and/or non-volatile memories. In other words, for example, the memory device 504 may be an electronic storage device (e.g., a computer readable storage medium) comprising gates configured to store data (e.g., bits) that may be retrievable by a machine (e.g., a computing device like the processor). For example, the memory device 504 could be configured to buffer input data for processing by the processor 502. Additionally or alternatively, the memory device could be configured to store instructions for execution by the processor.

The processor 502 may be embodied in a number of different ways. For example, the processor 502 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 502 may include one or more processors configured in tandem via the bus to enable independent execution of instructions, pipelining and/or multithreading. The processor may be embodied as a microcontroller having custom bootloader protection for the firmware from malicious modification in addition to allowing for potential firmware updates.

In an example embodiment, the processor 502 may be configured to execute instructions stored in the memory device 504 or otherwise accessible to the processor 502. Alternatively or additionally, the processor 502 may be configured to execute hard coded functionality. As such, whether configured by hardware or software methods, or by a combination thereof, the processor 502 may represent an entity (e.g., physically embodied in circuitry) capable of performing operations according to an embodiment of the present disclosure while configured accordingly. Thus, for example, when the processor 502 is embodied as an ASIC, FPGA or the like, the processor 502 may be specifically configured hardware for conducting the operations described herein. Alternatively, as another example, when the processor 502 is embodied as an executor of software instructions, the instructions may specifically configure the processor 502 to perform the algorithms and/or operations described herein when the instructions are executed. However, in some cases, the processor 502 may be a processor of a specific device (e.g., a vehicle control module) configured to employ an embodiment of the present disclosure by further configuration of the processor 502 by instructions for performing the algorithms and/or operations described herein. The processor 502 may include, among other things, a clock, an arithmetic logic unit (ALU) and logic gates configured to support operation of the processor 502. In one embodiment, the processor 502 may also include user interface circuitry configured to control at least some functions of one or more elements of the damping system 508.

The communications module 506 may include various components, such as a device or circuitry embodied in either hardware or a combination of hardware and software that is configured to receive and/or transmit data for communicating data between a steering system, damping system, and vehicle controller as described herein. In this regard, the communications module 506 may include, for example, an antenna (or multiple antennas) and supporting hardware and/or software for enabling communications wirelessly. Additionally or alternatively, the communications module 506 may be configured to communicate via wired communication with other components of a vehicle or a computing device as described herein.

The damping system 508 may be in communication with the processor 502 to receive an indication of a steering rate of change, a damping rate, vehicle speed, or the like. The damping system 508 may also be in communication with the memory device 504 and/or the communications module 506, such as via a bus.

The controller 500, as described herein, can receive steering rate of change input from sensor(s) 510 and may receive steering input information from the steering wheel or steering shaft as described above. The controller may further receive damping rate information from the sensor(s) 510 to provide closed-loop feedback on the damping state of the damping system.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system for damping steering of a vehicle comprising:
   a steering mechanism of the vehicle for steering a pair of steerable wheels about an axis substantially perpendicular to an axis of rotation of a respective one of the pair of steerable wheels;
   a first damper having a first damping rate, wherein the first damper is attached between the steering mechanism and the vehicle; and
   a second damper having a second damping rate, wherein the second damper is attached between the steering mechanism and the vehicle,
   wherein the first damper applies the first damping rate to the steering mechanism in response to a steering change rate of the pair of steerable wheels below a predetermined rate, and
   wherein the second damper provides the second damping rate to the steering mechanism in response to the steering change rate above the predetermined rate.

2. The system of claim 1, wherein the steering change rate comprises a rate at which the pair of steerable wheels turn about the axis.

3. The system of claim 2, wherein the second damping rate is greater than the first damping rate.

4. The system of claim 3, wherein the first damping rate is a linear rate of damping force relative to the steering change rate.

5. The system of claim 4, wherein the second damping rate is a linear rate of damping force relative to the steering change rate.

6. The system of claim 4, wherein the second damping rate is a non-linear rate of damping force relative to the steering change rate.

7. The system of claim 4, wherein the second damping rate substantially locks the steering mechanism.

8. The system of claim 1, wherein the first damper is attached at a first end to a steering member of the steering mechanism extending substantially laterally between the pair of steerable wheels, and the first damper is attached at a second end to a structural member of the vehicle.

9. The system of claim 8, wherein the second damper is attached at a first end to a steering member of the steering mechanism extending substantially laterally between the pair of steerable wheels, and the second damper is attached at a second end to the structural member of the vehicle, wherein the first damper and the second damper are configured to function in parallel.

10. The system of claim 1, further comprising a controller, wherein the controller receives as input the steering change rate, wherein the controller controls a damping rate of the second damper based on the steering change rate.

11. The system of claim 10, wherein the controller is further configured to determine when the steering change rate of the pair of steerable wheels is generated by a surface along which the pair of steerable wheels travel and determine when the steering change rate of the pair of steerable wheels is generated by input from a steering shaft.

12. The system of claim 11, wherein the controller commands the second damping rate of the second damper and adjusts the second damping rate of the second damper differently when the steering change rate of the pair of steerable wheels is generated by the surface along which the pair of steerable wheels travel than when the steering change rate of the pair of steerable wheels is generated by the input from the steering shaft.

13. The system of claim 12, wherein the second damping rate of the second damper is higher when the steering change rate of the pair of steerable wheels is generated by the surface along which the pair of steerable wheels travel than when the steering change rate of the pair of steerable wheels is generated by the input from the steering shaft.

14. A method for damping steering of a vehicle comprising:
steering a pair of steerable wheels of the vehicle with a steering mechanism about an axis substantially perpendicular to an axis of rotation of a respective one of the pair of steerable wheels;
damping the steering mechanism at a first damping rate in response to a steering change rate of the pair of steerable wheels below a predetermined rate; and
damping the steering mechanism at a second damping rate in response to the steering change rate of the pair of steerable wheels above the predetermined rate,
wherein the damping the steering mechanism at the first damping rate is achieved with a first steering damper, and the damping the steering mechanism at the second damping rate is achieved with a second steering damper.

15. The method of claim 14, wherein the second damping rate resists the steering change rate greater than the first damping rate.

16. The method of claim 14, further comprising:
determining whether the steering change rate of the pair of steerable wheels is generated by a surface along which the pair of steerable wheels travel or generated by input from a steering shaft; and
damping the steering mechanism differently when the steering change rate of the pair of steerable wheels is generated by the surface along which the pair of steerable wheels travel than when the steering change rate of the pair of steerable wheels is generated by the input from the steering shaft.

17. An apparatus for damping steering of a vehicle comprising:
a first damper disposed between a steering mechanism of the vehicle a structural member of the vehicle, the steering mechanism of the vehicle configured for steering a pair of steerable wheels about an axis substantially perpendicular to an axis of rotation of a respective one of the pair of steerable wheels; and
a second damper disposed between the steering mechanism of the vehicle and the structural member of the vehicle;
wherein the first damper provides a first damping rate based on a rate of change of steering of the pair of steerable wheels being below a predefined rate, and wherein the second damper provides a second damping rate based on the rate of change of steering of the pair of steerable wheels being above the predefined rate.

18. The apparatus of claim 17, wherein the second damping rate resists steering of the pair of steerable wheels at a greater rate than the first damping rate.

19. The apparatus of claim 17, wherein the first damper operates in parallel with the second damper.

* * * * *